United States Patent [19]

Massie

[11] 3,859,428

[45] Jan. 7, 1975

[54] PRODUCTION OF HYDROGEN
[75] Inventor: Stephen N. Massie, Palatine, Ill.
[73] Assignee: Universal Oil Products Company, Des Plaines, Ill.
[22] Filed: Apr. 2, 1973
[21] Appl. No.: 347,586

[52] U.S. Cl................. 423/651, 423/648, 252/373
[51] Int. Cl........ C01b 1/02, C01b 1/18, C01b 2/16
[58] Field of Search..................... 423/651, 653, 648

[56]  References Cited
UNITED STATES PATENTS

| | | | |
|---|---|---|---|
| 1,736,065 | 11/1929 | Williams | 423/653 |
| 2,940,840 | 6/1960 | Shapleigh | 423/651 X |
| 3,321,395 | 5/1967 | Paterson | 423/651 X |
| 3,691,063 | 9/1972 | Kirk, Jr. | 208/91 |

Primary Examiner—Edward Stern
Attorney, Agent, or Firm—James R. Hoatson, Jr.; Raymond H. Nelson; William H. Page, II

[57] ABSTRACT

Hydrogen is produced by the oxidation of a petroleum fraction in the presence of a catalyst comprising a salt containing nickel or manganese dispersed on a basic inorganic support.

9 Claims, No Drawings

PRODUCTION OF HYDROGEN

This invention relates to a process for the production of hydrogen in the presence of certain catalytic compositions of matter. More specifically, this invention relates to a process for the production of hydrogen from the oxidation of a petroleum fraction in the presence of a catalyst comprising a salt containing nickel or manganese.

It has been shown in the prior art that aromatic compounds may be oxidized to a corresponding oxidized aromatic compound where the aromatic compounds are reacted with elemental oxygen usually in the form of air in the presence of a metal selected from Group IB or Group VIII of the Periodic Table in a medium comprising a lower aliphatic acid. It has also been shown that a manganese carbonate-containing mineral has been utilized as a catalyst in a hydrocarbon conversion process (such as hydrocracking) demonstrating a high alpha value relative to the conventional amorphous silica-alumina.

In contradistinction to the prior art it has now been discovered that hydrogen may be produced from the oxidation of a petroleum fraction which is insoluble in light paraffinic hydrocarbons, said oxidation being effected in the presence of a catalyst comprising a salt containing nickel or manganese which may be supported on a basic inorganic support. The utilization of the present invention will allow the refiner to increase his supply of hydrogen, which will be especially important when the refinery is limited to certain specialities such as synthetic natural gas. The utilization of the present invention will also allow the refiner to upgrade his supply of asphalt for utilization in the construction of roads as a result of the loss of hydrogen from the petroleum fraction which enhances the physical properties of the asphalt. The refiner will be able to reduce his cost of operation of the refinery as a result of the mitigation of hydrogen purchasing and a better grade of asphalt product, thereby reducing the cost of refining to the ultimate consumer of asphalts, gasoline, kerosine, jet fuel, synthetic natural gas, etc.

The desired product of the process of the present invention, namely hydrogen, may be utilized in the refinery and chemical industry in many ways. For example, the use of hydrogen in the production of synthetic natural gas, synthetic ammonia or synthetic methanol; or the hydrogenation of organic materials such as naphthalene, phenol, benzene, toluene, cumene, oils; or as a reducing agent for organic synthesis and the reduction of metallic ores; or in reducing atmospheres to prevent oxidation; or as an oxyhydrogen flame for obtaining high temperatures; or in atomic-hydrogen welding; or as an inflation agent for small balloons; or in the preparation of hydrochloric and hydrobromic acids or as a rocket fuel.

It is therefore an object of this invention to provide a process for the production of hydrogen.

A further object of this invention is to provide a process for the production of hydrogen utilizing certain catalytic compositions of matter which will permit the recovery of the desired compound in a more expedient manner.

In one aspect an embodiment of this invention resides in a process for the production of hydrogen which comprises the treating of a petroleum fraction with an oxygen-containing gas in the presence of a catalyst comprising a salt containing nickel or manganese at reaction conditions and recovering the resultant hydrogen.

A specific embodiment of this invention resides in a process for producing hydrogen which comprises the partial oxidation of a petroleum fraction which is insoluble in n-pentane by a stream of air in the presence of a catalyst comprising nickel bromide dispersed on calcium carbonate at a temperature in the range of about 100°C to about 600°C and a pressure in the range of about one atmosphere to about 100 atmospheres, and recovering the resultant hydrogen.

Another specific embodiment of this invention resides in a process for producing hydrogen which comprises the partial oxidation of a petroleum fraction which is insoluble in n-heptane by a stream of oxygen-enriched air in the presence of a catalyst comprising manganese benzoate at a temperature of 300°C and a pressure of 50 atmospheres, and recovering the resultant hydrogen.

Other objects and embodiments will be found in the following further detailed description of the present invention.

As hereinbefore set forth, the present invention is concerned with a process for preparing hydrogen, said process being effected by the oxidation of a petroleum fraction in the presence of certain catalytic compositions of matter. The reaction is effected under conditions which include an elevated temperature in the range of from about 100°C to about 1,000°C and preferably within the range of from about 150°C to about 600°C. In addition, another reaction condition involves pressures, said pressures ranging from about atmospheric up to about 100 atmospheres or more. When super-atmospheric pressures are employed, said pressure is afforded by the introduction of air or oxygen to the oxidation zone or, if so desired, the pressure may be increased from that of the oxidation level by the introduction of a substantially inert gas such as nitrogen. The oxygen-containing gas which contacts the petroleum fraction should be insufficient for stoichiometric oxidation of the hydrogen values of the petroleum fraction such that minimum oxidation of the hydrogen to water would occur. The ratio of the hydrogen present to that of the oxygen present would be about 2.1 to about 20.

Examples of suitable petroleum fractions which are utilized as one of the starting materials of the process of the present invention would include petroleum fractions (commonly known in the art as asphaltic materials) which are insoluble in light paraffinic hydrocarbons. The light paraffinic hydrocarbons utilized as potential solvents in determination of asphaltic properties would include n-pentane, n-hexane, n-heptane, etc.

The oxidation agent utilized in the process of the present invention would include air, oxygen, any mixture thereof or any other suitable oxidizing agent.

The catalytic compositions of matter which are used in the process of this invention comprise salts containing nickel or manganese, or mixtures thereof. Suitable examples of catalysts containing nickel or manganese would be exemplified by the following: nickel acetate, nickel acetylacetonate, nickel chloride, nickel bromide, nickel iodide, nickel fluoride, nickel carbonate, nickel propionate, nickel formate, nickel hydroxide, nickel molybdate, nickel nitrate, nickel oxide, nickel sulfate, nickel sulfide, manganese acetate, manganous chloride, manganous fluoride, manganous bromide, manganous iodide, manganese dioxide, manganese naphthenate, manganese nitrate, manganese oxide, manganese phosphate, manganese sulfate, manganous formate, manganous propionate, manganous oxide, manganous sulfate, manganic chloride, manganic formate, manganic propionate, nickel chloride-manganous oxide, nickel carbonate-manganous sulfate, etc. In a preferred embodiment of the process of the present invention it is shown that the manganous or nickel salt may be present as dispersed on a basic inorganic support. When such a support is used the metal salt is dispersed on the basic inorganic support in the range of from 0.01 weight percent to about 40 weight percent and preferably in the range of about 0.05 weight percent to about 5.0 weight percent. Suitable examples of basic inorganic support would include the alkali or alkaline earth metal carbonates as exemplified by the following: calcium carbonate, lithium carbonate, sodium carbonate, magnesium carbonate, rubidium carbonate, potassium carbonate, magnesium oxide, etc.

It is understood that the aforementioned nickel and manganese containing salts and basic inorganic supports are only representative of the class of compounds which may be employed, and that the present invention is not necessarily limited thereto.

The process of this invention may be effected in any suitable manner and may comprise either a batch or continuous type operation. For example, when a batch type operation is employed, the petroleum fraction, which is insoluble in light paraffinic hydrocarbon, is placed in an appropriate vessel along with a catalyst comprising a salt containing nickel or manganese or, if so desired, the salt may be dispersed on a basic inorganic support. The autoclave is then sealed and air or oxygen gas is pressed in until the desired operating pressure is reached. The autoclave is then heated to the desired operating temperature and maintained thereat for a predetermined residence time. At the end of this time, heating is discontinued, the autoclave is allowed to return to room temperature and the product gas is discharged and subsequently separated by various methods known to the art such as liquification, fractionation or membrane diffusion to obtain the desired hydrogen at the requisite purity.

It is also contemplated within the scope of this invention that the process for obtaining hydrogen may be effected in a continuous manner of operation. When such a type of operation is employed, the petroleum fraction, which is insoluble in light paraffinic hydrocarbons, is continuously charged to the reaction oxidation vessel containing a catalyst comprising a salt containing nickel or manganese or, if so desired, the salt may be dispersed on a basic inorganic support, said reaction vessel being maintained at proper operating conditions of temperature and pressure. The reaction zone is also equipped with a means of attainment of air or oxygen by the ingress of a gaseous stream. After completion of the desired residence time, the reactor effluent is continuously withdrawn while the vessel is continuously vented to remove the gaseous product and to recover the desired gaseous hydrogen. Inasmuch as the catalytic composition of matter is solid in nature, various types of continuous operation may be used. One such type of operation comprises the fixed bed method in which the catalyst comprising a salt containing nickel or manganese is disposed as a fixed bed in the reaction zone upon a basic inorganic support and the petroleum fraction, which is insoluble in light paraffinic hydrocarbons, is passed over said fixed bed in either an upward or a downward flow. The gas mixture which includes the hydrogen formed from said process is recovered at the top of the reaction vessel while the petroleum fraction is recovered at the bottom of the reaction zone.

Another method of operation which may be utilized when the nickel or manganese salts are finely dispersed on a basic inorganic support is to distribute the support and catalyst throughout the reactor to effect the partial oxidation of the petroleum fraction and recovery of the desired hydrogen and allowing the support and catalyst to remain in the petroleum fraction as a result of low expense of the support and catalyst versus the cost of recovery.

The following examples are given to illustrate the process of the present invention which, however, are not intended to limit the generally broad scope of the present invention in strict accordance therewith.

EXAMPLE I

In this example 27.0 grams of a petroleum fraction, which is insoluble in n-pentane and n-heptane, are added to an autoclave containing 0.05 grams of nickel bromide disposed on 5.0 grams of a support comprising calcium carbonate, said autoclave being equipped with heat and pressure devices. The autoclave is sealed, charged with 5 atmospheres of air and heated to a temperature of 200°C and maintained thereat for a period of time comprising 3 hours. At the end of this period of time heating is terminated thereby allowing said autoclave to return to room temperature. The autoclave is vented and the egressing gas is recovered and analyzed by means of gas-liquid chromatography, said analysis discloses a greater percentage of hydrogen gas than normally expected when oxidation occurs in the absence of a catalyst comprising a nickel containing compound (nickel bromide).

EXAMPLE II

In this example 33.3 grams of a petroleum fraction, which is insoluble in n-pentane, are added to an autoclave containing 0.2 grams of manganese benzoate, said autoclave being equipped with heat and pressure devices. The autoclave is charged with 7 atmospheres of air and is heated to a temperature of 300°C and maintained thereat for a period of time comprising 4 hours, at the end of which the heating is terminated thereby allowing said autoclave to return to room temperature. The autoclave is opened and the egressing gas is recovered and analyzed by means of gas-liquid chromatography, said analysis discloses a greater percentage of hydrogen gas than normally expected when oxidation occurs in the absence of a catalyst comprising a manganese containing compound (manganese benzoate).

EXAMPLE III

In this example 75.0 grams of a petroleum fraction, which is insoluble in n-pentane and n-heptane, are added to an autoclave containing 0.45 grams of nickel acetate on a calcium carbonate support, said autoclave being equipped with heat and pressure devices. The autoclave is charged with 15 atmospheres of air and heated to a temperature of 225°C and maintained thereat for a period of time comprising 4.5 hours at the end of which the heating is terminated thereby allowing said autoclave to return to room temperature. The autoclave is opened and the egressing gas is recovered and analyzed by means of gas-liquid chromatograph instrumentation, said analysis discloses a greater percentage of hydrogen gas than normally expected when oxidation occurs in the absence of a catalyst comprising a nickel containing compound (nickel acetate).

EXAMPLE IV

In this example, 135.0 grams of a petroleum fraction, which is insoluble in n-pentane and n-heptane, are added to an autoclave containing 0.5 grams of manganous nitrate on a sodium carbonate support, said autoclave being equipped with heat and pressure devices. The autoclave is charged with 25 atmospheres of air and is heated to a temperature of 250°C and maintained thereat for a period of time comprising 3 hours at the end of which the heating is terminated thereby allowing the autoclave to return to room temperature. The autoclave is opened and the egressing gas is recovered and analyzed by means of gas-liquid chromatography instrumentation, said analysis discloses a greater percentage of hydrogen gas than normally expected when oxidation occurs in the absence of a catalyst comprising a manganese containing compound (manganous nitrate).

EXAMPLE V

In this example 51.0 grams of a petroleum fraction, which is insoluble in n-pentane and n-heptane, are added to an autoclave containing 0.1 grams of nickel formate on a calcium carbonate support, said autoclave being equipped with heat and pressure devices. The autoclave is charged with 55 atmospheres of air and is heated to a temperature of 550°C and maintained thereat for a period of time comprising 6 hours, at the end of which the heating is terminated thereby allowing the autoclave to return to room temperature. The autoclave is opened and the egressing gas recovered and analyzed by means of gas-liquid chromatography instrumentation, said analysis discloses a greater percentage of hydrogen gas than normally expected when oxidation occurs in the absence of a catalyst comprising a nickel containing compound (nickel formate).

I claim as my invention:

1. A process for the production of hydrogen which comprises partially oxidizing an asphaltene petroleum fraction which is insoluble in light paraffinic hydrocarbons a gas consisting of an elemental oxygen-containing gas having an oxygen content insufficient for stoichiometric oxidation of the hydrogen values of the petroleum fraction, so that minimum oxidation of the hydrogen values to water will occur, in the presence of a catalyst comprising a salt containing nickel or manganese dispersed on a basic inorganic support at a temperature in the range of from about 100°C to about 1,000°C, a pressure in the range of about atmospheric to about 100 atmospheres and a contact time of at least about 3 hours, to produce a resultant gas mixture containing hydrogen and recovering hydrogen therefrom.

2. The process of claim 1 further characterized in that said salt is nickel bromide.

3. The process of claim 1 further characterized in that said salt is manganese benzoate.

4. The process of claim 1 further characterized in that said salt is nickel acetate.

5. The process of claim 1 further characterized in that said salt is manganous nitrate.

6. The process of claim 1 further characterized in that said salt is nickel formate.

7. The process of claim 1 further characterized in that the basic inorganic support is an alkali or alkaline earth metal carbonate.

8. The process of claim 7 further characterized in that said carbonate is sodium carbonate.

9. The process of claim 7 further characterized in that said carbonate is calcium carbonate.

* * * * *